United States Patent
Schweid et al.

(10) Patent No.: US 9,176,221 B2
(45) Date of Patent: Nov. 3, 2015

(54) DISTANCE ESTIMATION IN CAMERA-BASED SYSTEMS UTILIZING MOTION MEASUREMENT AND COMPRESSION ATTRIBUTES

(75) Inventors: Stuart A. Schweid, Pittsford, NY (US); Edgar A. Bernal, Webster, NY (US)

(73) Assignee: XEROX CORPORATION, Norwalk, CT (US)

(*) Notice: Subject to any disclaimer, the term of this patent is extended or adjusted under 35 U.S.C. 154(b) by 494 days.

(21) Appl. No.: 13/596,411

(22) Filed: Aug. 28, 2012

(65) Prior Publication Data

US 2014/0063258 A1 Mar. 6, 2014

(51) Int. Cl.
*H04N 7/18* (2006.01)
*G01S 11/12* (2006.01)
*G06T 7/00* (2006.01)

(52) U.S. Cl.
CPC ............ *G01S 11/12* (2013.01); *G06T 7/0071* (2013.01); *H04N 7/181* (2013.01)

(58) Field of Classification Search
CPC ........... G01S 11/12; G06T 7/004; G06T 7/20; H04N 7/181; H04N 7/188; G08B 13/19602; G08B 13/19634
USPC .......................................... 348/140, 154, 155
See application file for complete search history.

(56) References Cited

U.S. PATENT DOCUMENTS

2010/0046802 A1* 2/2010 Watanabe et al. ............. 382/106
2010/0136957 A1* 6/2010 Horodezky et al. ........ 455/414.2

OTHER PUBLICATIONS

Ens et al., "An Investigation of Methods for Determining Depth from Focus" IEEE Trans. On Pattern Analysis and Machine Intelligence, vol. 15(2), 1993.
Smart Measure—https://playgoogle.com/store/apps/details?id=kr.sira.measure&hl=en, accessed Aug. 21, 2012, 2 pgs.
Hong et al., "SenseCoding: Accelerometer-Assisted Motion Estimation for Efficient Video Encoding" '08 Proceedings of the 16th ACM international conference on Multimedia, 4 pgs.
Sohn et al., "A Region Depth Estimation Algorithm using Motion Vector from Monocular Video Sequence" Proceedings from Signal and Image Processing, Aug. 23-25, 2004, pp. 482-487.

* cited by examiner

*Primary Examiner* — Michael Lee
(74) *Attorney, Agent, or Firm* — Fay Sharpe LLP

(57) ABSTRACT

When estimating distance to an object in an image using a single camera, data acquired by an onboard accelerometer is analyzed to determine camera speed as the user takes a video of the object of interest. The compression that results during video processing is used to derive motion vectors for the object of interest in the scene. The motion vectors have an opposite direction to the camera motion and a magnitude that is a function of the unknown object distance and a known magnification level. The object distance is calculated from the estimated velocity and motion vector magnitude.

23 Claims, 4 Drawing Sheets

DISTANCE ESTIMATION IN CAMERA-BASED SYSTEMS UTILIZING MOTION MEASUREMENT AND COMPRESSION ATTRIBUTES

TECHNICAL FIELD

The presently disclosed embodiments are directed toward estimating distance to an object using motion measurement and video compression attributes derived from video captured by a single camera. However, it is to be appreciated that the present exemplary embodiments are also amenable to other like applications.

BACKGROUND

In order to measure distance in a conventional visual system, two or more cameras with different perspectives are usually needed. Alternatively, multiple images of the same scene at different settings can be used. There are smart phone applications that perform distance estimation using a known height of the user and determination of camera orientation to estimate the distance of the object, but such approaches are very sensitive to camera height and typically require a reference image to be captured a known camera height and/or camera angle.

The determination of distance is useful in many applications, such as establishing the distance to a target in military applications, modeling of 3D structures (e.g. sizing a room or a building), and in sports (e.g. distance to hole estimation in golf, distance to target measurement in archery or distance to prey assessment in hunting). Some conventional distance measurement instruments use either laser or ultrasound as a mechanism for measuring the distance. The ultrasound-based instruments measure the time of flight for a sound pulse while the laser based systems can utilize either time of flight or phase shift methods to measure distance. While ultrasound and laser based instruments are accurate, each requires specialized equipment to perform the task.

The ability to measure distance using a single camera is an underdetermined problem; there is insufficient information in a single monocular picture to determine distance of an object in an image. In order to measure distance using purely visual (i.e. camera) information, more than one image is needed. At least two images, each with a different perspective angle and known relative positions, are conventionally employed as images of a common scene to allow for the determination of distance of the object. Typically this is done with two cameras, but it can be accomplished using a single camera if the scene is sufficiently static, for example, via depth-from-defocus methods (which estimate the distance of an object to the camera based on its degree of defocus at different camera focal settings) or structure-from-motion (which estimate the 3D structure of an object from tracking information of multiple features representative of the object as the camera moves). These methods, however, are computationally expensive.

Video compression is employed in applications where high quality video transmission and/or archival is required. Video compression is achieved by exploiting two types of redundancies within the video stream: spatial redundancies amongst neighboring pixels within a frame, and temporal redundancies between adjacent frames. This modus operandi gives rise to two different types of prediction: intra-frame and inter-frame. These in turn result in two different types of encoded frames: reference and non-reference frames. Reference frames, or "I-frames" are encoded in a standalone manner (intra-frame) using compression methods similar to those used to compress digital images. Compression of non-reference frames (e.g., P-frames and B-frames) entails using inter-frame or motion-compensated prediction methods where the target frame is estimated or predicted from previously encoded frames in a process that typically entails three steps: (i) motion estimation, where motion vectors are estimated using previously encoded frames. The target frame is segmented into pixel blocks called target blocks, and an estimated or predicted frame is built by stitching together the blocks from previously encoded frames that best match the target blocks. Motion vectors describe the relative displacement between the location of the original blocks in the reference frames and their location in the predicted frame. While motion compensation of P-frames relies only on previous frames, previous and future frames are typically used to predict B-frames; (ii) residual calculation, where the error between the predicted and target frame is calculated; and (iii) compression, where the error residual and the extracted motion vectors are quantized, compressed and stored. Since video compression is typically performed at the camera end prior to transmission over the network, real-time hardware implementations of popular algorithms such as H264 and MPEG4 are commonplace.

There is a need in the art for systems and methods that facilitate performing single camera distance estimation by leveraging information extracted in the real-time video compression process while overcoming the aforementioned deficiencies.

BRIEF DESCRIPTION

In one aspect, a computer-implemented method for estimating distance to an object using motion measurement and video compression attributes derived from video captured by a single camera comprises estimating camera velocity using one or more camera motion values provided by an accelerometer associated with the camera, and identifying frame motion vectors generated during compression of video captured by the camera; The method further comprises estimating distance to a target object from the one or more camera motion values provided by the accelerometer and motion vector information, and reporting at least one distance-to-object measurement.

In another aspect, a system that facilitates estimating distance to an object using motion measurement and video compression attributes derived from video captured by a single camera comprises a non-transitory computer-readable medium that stores computer-executable instructions for execution by a processor, and a processor configured to execute the instructions. The instructions comprise estimating camera velocity using one or more camera motion values provided by an accelerometer associated with the camera, and identifying frame motion vectors generated during compression of video captured by the camera. The instructions further comprise estimating distance to a target object from the one or more camera motion values provided by the accelerometer and motion vector information, and reporting at least one distance-to-object measurement.

In yet another aspect, a non-transitory computer-readable medium that stores computer-executable instructions for estimating distance to an object using motion measurement and video compression attributes derived from video captured by a single camera, the instructions comprising estimating camera velocity using one or more camera motion values provided by an accelerometer associated with the camera, and identifying frame motion vectors generated during compression of video captured by the camera. The instructions further comprise estimating distance to a target object from the one or more camera motion values provided by the accelerometer and motion vector information, and reporting at least one distance-to-object measurement

DETAILED DESCRIPTION

The above-described problem is solved by employing data acquired by an onboard accelerometer to determine camera speed as the user takes a video of the object of interest. The compression that results during video processing is used to derive motion vectors for the object of interest in the scene. The motion vectors have an opposite direction to the camera motion and a magnitude that is a function of the unknown object distance and a known magnification level. The object distance is calculated from the estimated velocity and motion vector magnitude. It will be understood that although subject innovation is described herein with regard to the camera and accelerometer onboard a smartphone, in other embodiments the innovation may be employed in a stand-alone camera with an onboard accelerometer and processor.

The smart phone has become a ubiquitous device that includes a powerful combination of camera(s), a motion estimation system (i.e. accelerometer) and processing power. These features make the smart phone a potent platform for image and video processing technology that can provide useful application and widespread deployment. Many smartphones, however, have a built-in accelerometer that can provide relatively accurate velocity and position information of the phone's camera, which can be used in conjunction with the image from the camera to estimate distance.

Figure 1:
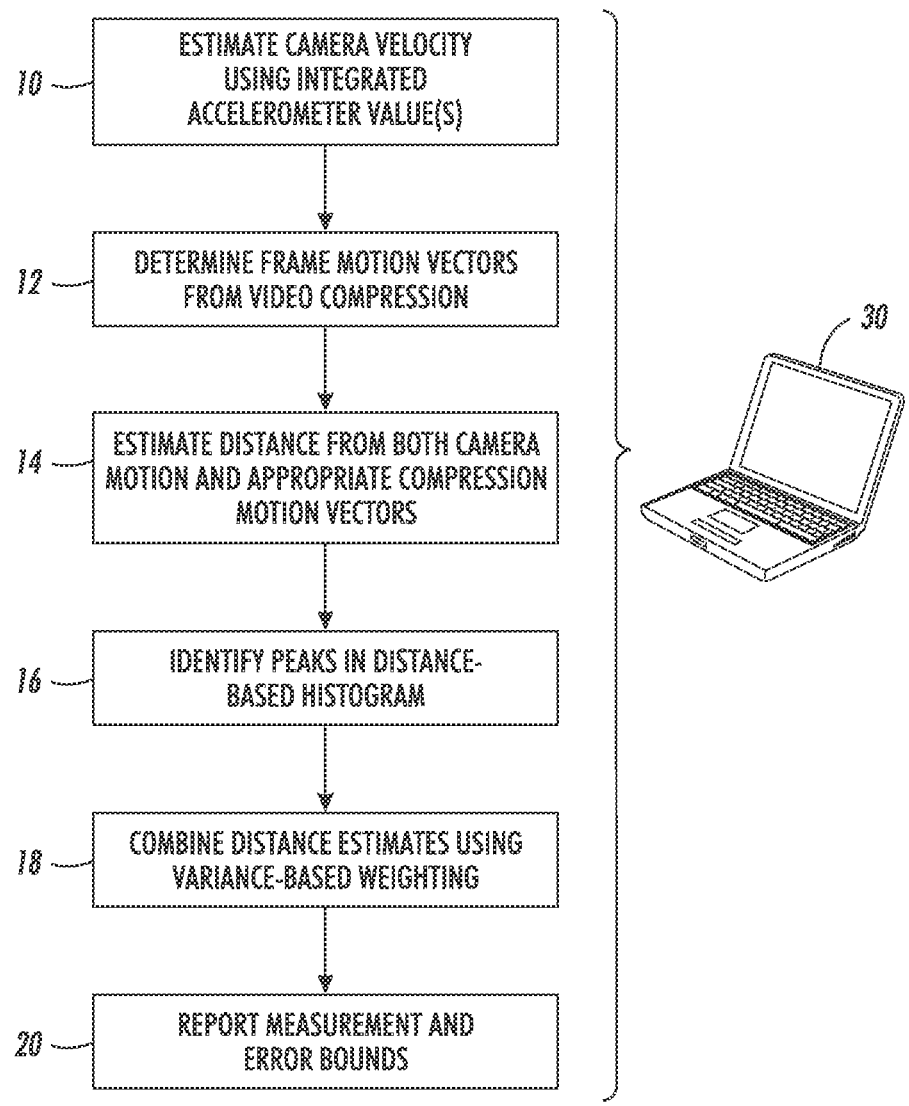
FIG. 1 illustrates a method for estimating distance to an object using motion measurement and video compression attributes derived from video captured by a single camera, in accordance with one or more features described herein.

FIG. 1 illustrates a method for estimating distance to an object using motion measurement and video compression attributes derived from video captured by a single camera, in accordance with one or more features described herein. The camera may be, for example, a camera in the smart phone or the like. The smartphone may further include, for example, an onboard accelerometer. At 10, while the video is being captured by the camera, camera velocity is estimated using one or more camera motion values provided by an accelerometer associated with the camera. In one example, an integrated value of an onboard accelerometer is used to estimate the camera velocity (e.g., both direction and magnitude). At 12, frame motion vectors are determined from video compression. For instance, the frame motion vectors used for video compression are identified by searching in (or near) the direction of movement measured by the (integrated) accelerometer (e.g. by using SenseCoding or the like) of the camera, in contrast to using conventional techniques that use only the visual data in the video. At 14, distance to a target object is estimated from both camera motion information provided by the accelerometer and compression motion vector information. For instance, distance from both the camera motion and the appropriate (i.e. aligned with the direction of camera motion rather than optimized purely for maximal redundancy) compression motion vectors are estimated. In one example, the "appropriate" compression motion vectors are vectors that fall within a predetermined alignment threshold (e.g. 30° or some other predetermined alignment threshold) of the direction of camera motion. In another example, Equation 4(a) (below) can be used to perform this estimation.

At 16, peaks in a distance-based histogram are identified in order to isolate objects and remove noise. At 18, distance estimates are combined using variance-based weighting. In one example, Equation (6) (below) can be employed. At 20, an estimated distance-to-object measurement is output and or stored to a computer readable medium. According to one example, error bounds and/or estimated measurement precision information is also output and/or stored. For example, equation 5(a) (below) can be employed.

The described method facilitates combining specialized techniques created to optimize the calculation of motion vectors for compression with algorithms for distance estimation from motion. Additionally, distance estimates from several pairs of frames can be combined to minimize estimation error. One advantage is that the accelerometer data (e.g., 3 values per frame or the like) can be saved in the compressed video format (e.g. in the comment field) for subsequent post-processing of distance estimation, either locally or remotely.

It will be appreciated that the method of FIG. 1 can be implemented by a computer 30, which comprises a processor (such as the processor 124, 164 of FIGS. 3 and 4) that executes, and a memory (such as the memory 126, 166 of FIGS. 3 and 4) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIGS. 3, 4), a system memory (see, e.g., FIGS. 3, 4), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

The incorporation of motion vectors derived during video compression mitigates the sensitivity of distance estimation to camera height, camera calibration and accelerometer offsets. In this invention the user takes a short video of the object whose distance is desired while moving the camera (e.g. sweeping, panning, rotating, etc.). Motion vectors needed for video compression are determined for this object in the scene and recorded. The motion vectors are represented in the camera pixel geometry: the number of pixels the object has moved from frame to frame. Motion is thus correlated to the camera velocity information garnered from the accelerometer. Using homogenous coordinates, the distance can be calculated.

Where the camera motion is known and the object motion is considered small in the scene coordinate system, there are specialized methods for determining the motion vectors. Algorithms such as Sense Coding use the accelerometer to determine the direction of the motion vectors in the frame and limit the block matching search area to those directions. In this case, the motion vectors are well aligned with the camera motion, greatly decreasing the probability the motion detection algorithm will erroneously match non-concurring blocks in successive frames. This method is well-suited for the processing employed in distance estimation.

Still referring to FIG. 1, once motion vectors have been estimated with the help of the accelerometer data, the relationship between the motion vector amplitudes and the actual distance is evaluated. Homogenous coordinate transformations provide a relationship between camera coordinates and real-world coordinates. Using homogenous coordinates with magnification d, it can be shown that:

$$\begin{bmatrix} x \\ y \\ z \\ z/d \end{bmatrix} = \begin{bmatrix} 1 & 0 & 0 & 0 \\ 0 & 1 & 0 & 0 \\ 0 & 0 & 1 & 0 \\ 0 & 0 & 1/d & 0 \end{bmatrix} \begin{bmatrix} x \\ y \\ z \\ 1 \end{bmatrix} \quad (1)$$

where the left hand side x,y,z are the homogenous camera coordinates with perspective divide (z/d) and the right hand side x,y and z (object distance) are coordinates in the "real world". The value d is a function of the camera magnification resulting from the system optics and sensor size, which are typically known from the specifications sheet of the device.

Moving the camera without rotation (thus preserving the unit xyz vectors) is equivalent to moving the scene in the opposite direction, such that:

$$x'_c = d*(x'/z - xz'/z^2)$$

$$y'_c = d*(y'/z - yz'/z^2) \quad (2)$$

where d is a fixed constant that is a function of the camera zoom optics and $x'_c$ and $y'_c$ are velocities in the camera coordinate system (estimated by motion vector algorithms during compression) while x' and y' are velocities of the camera itself (in the real world and measured by the accelerometer). The camera can also be moved in the xy plane (perpendicular to the optical axis and thus at very low z'), and if the object is not very close and in the center of the field of view then:

$$z' << x', y' \text{ and } x, y << z \quad (3)$$

and thus (2) can be well approximated by:

$$x'_c \approx d*(x'/z) => z = dx'/x'_c$$

$$y'_c \approx d*(y'/z) => z = dy'/y'_c \quad (4)$$

or in matrix form:

$$mv_{cam} = (d/z)*v_{real} => z = d(mv'_{cam} \cdot v_{real})/(mv'_{cam} \cdot mv_{cam}) \quad (4a)$$

where $mv_{cam}$ is the motion vectors in the camera domain ($x'_c$ i, +$y'_c$ j) and $v_{real}$ is the real velocity (x' i, +y' j). In other words, the speed at which an object moves in the camera coordinate system is inversely proportional to the distance of the object from the camera lens.

Once the motion vectors for each 8×8 (or other size, e.g., 4×4, 16×16, etc.) image block ($x'_c$ and $y'_c$) are determined using an algorithm such as Sense Coding and the camera speed is measured from the accelerometer input (x' and y'), the distance of every point in the frame (especially edges where the motion vector calculation is accurate) is calculated and the distance of every point in the scene is determined. In order to minimize errors it may be desirable that x' and y' (and thus $x'_c$ and $y'_c$) be as large as possible, since the smaller they are, the more sensitive the motion vectors are to errors in their calculation. Assuming that the resolution of the camera is isotropic and that errors are small, the error in the distance estimation can be estimated from:

$$z_{err} \approx (z/x')*x'_{err} - (z^2/(dx'))*x'_{cerr}$$

$$z_{err} \approx (z/y')*y'_{err} - (z^2/(dy'))*y'_{cerr} \quad (5)$$

or, in matrix form:

$$z_{err} \approx [z/(v'_{real} \cdot v_{real})]*v'_{real}*e_{vreal} + [z^2/(d*(v'_{real} \cdot v_{real}))] \\ *v'_{real}*e_{mvcam} \quad (5a)$$

where $x'_{err}$ and $y'_{err}$ are the speed error from the accelerometer measurement and $x'_{cerr}$ and $y'_{cerr}$ are the errors of the motion vector estimation in the camera domain. For the matrix notion, the vectors $e_{vreal}$ and $e_{mvcam}$ are ($x'_{err}$ i, +$y'_{err}$ j) and ($x'_{cerr}$ i, +$y'_{cerr}$ j) respectively. It will be noted in equation (5) that motion estimation becomes more accurate as the camera moves faster, as long as the frame rate of the video allows for the motion vectors to accurately capture the correspondence of features across adjacent frames.

Statistical analysis can be employed to determine the motion of the largest perspective object (e.g., the one that has the most edges in the camera coordinate system) or the distance of more than one object if there is more than a single peak in the motion vector space. Additionally, multiple frames give multiple estimates, and equation (5) or (5a) can be used to determine how to combine the estimates using a variance weighted combination instead of a simple averaging. In one example, since the error variance is inversely proportional to the camera speed (as shown in equation (5)), each distance estimation may be weighted by the measured velocity squared, i.e. $*(v'_{real} \cdot v_{real})$ in the averaging, i.e.:

$$z_{est} = \{\Sigma_i(v'_{i-real} \cdot v_{i-real})z_i\}/\{\Sigma_i(v'_{i-real} \cdot v_{i-real})\} \quad (6)$$

where $z_i$ is the distance estimate from the $i^{th}$ frame and $v_{i\text{-}real}$ is the measured velocity (in the xy plane—a vector quantity) of the $i^{th}$ frame (average velocity between the i−1th and ith frame).

Similarly, if several frames are taken, then the overall position measurement can be calculated by measuring the total change in position and total movement of edges in the image plane. This is similar to sub-sampling frames and only doing the calculation on the first and last frame for the distance measurement. While numerically simple, it requires the motion vector estimation calculation to consider a very large range, which conventional algorithms do not permit since they are optimized for compression with small displacements between frames.

The described algorithm can be extended to more complicated motion types of the camera. For example, if additional affine transformations are performed (e.g. if the camera motion contains rotation/skew as measured by the accelerometer), the additional transformation matrices can be concatenated with the perspective transformation matrix. In that instance, the relationship between motion vectors and true distance can be determined algebraically.

Figure 2:
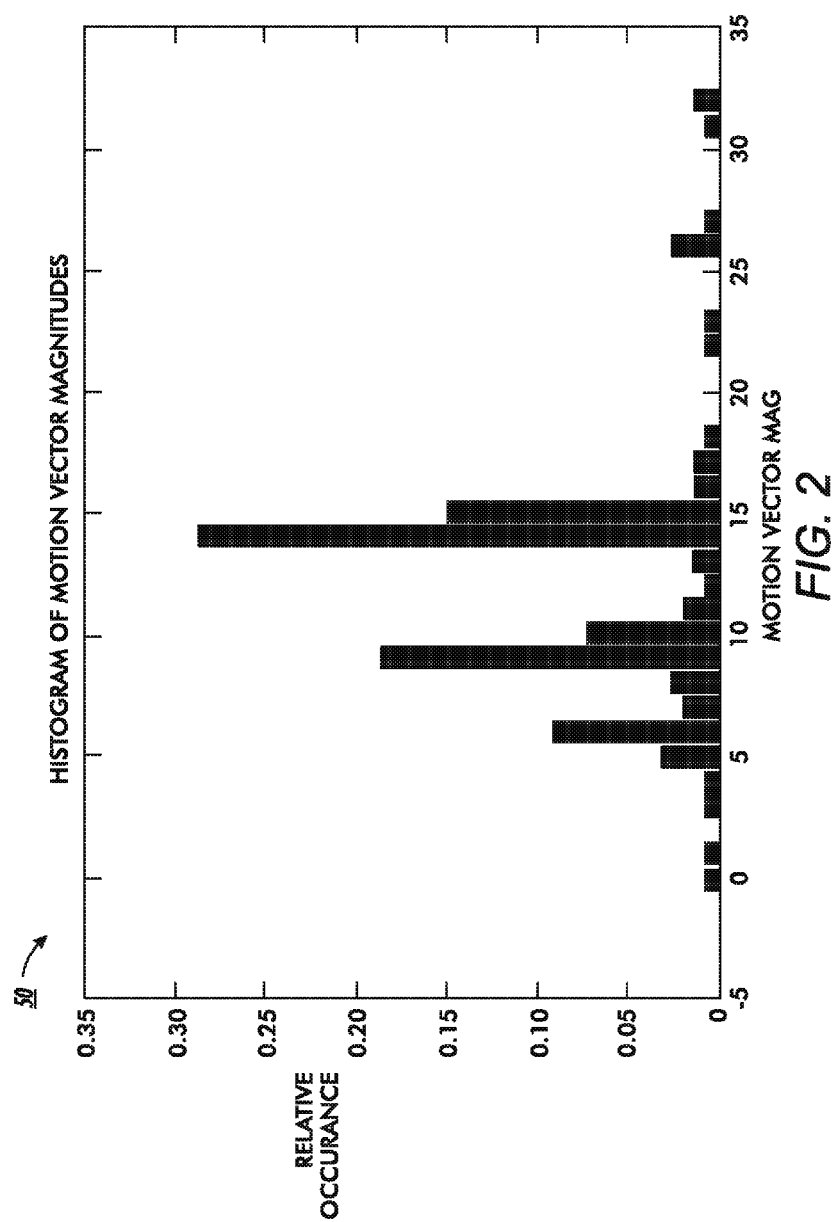
FIG. 2 shows a histogram of motion vector magnitudes as a function of relative occurrence, in accordance with one or more features described herein.

With continued reference to FIG. 1, FIG. 2 shows a histogram 50 of motion vector magnitudes as a function of relative occurrence, in accordance with one or more features described herein. The closest object (and thus the one with the greatest captured motion magnitude) has the most number of vectors measured as it is the largest object in the captured scene. According to an example, for three objects captured, their true (i.e. actual) distances and measured distances may be as follows:

True distance[in]=[13 20.5 31]

Measured distance[in]=[12.9 19.9 32.1]

where the conversion from relative distance to absolute distance for the measured distance is performed by assuming a camera speed that gives the closest possible measurement result.

Figure 3:
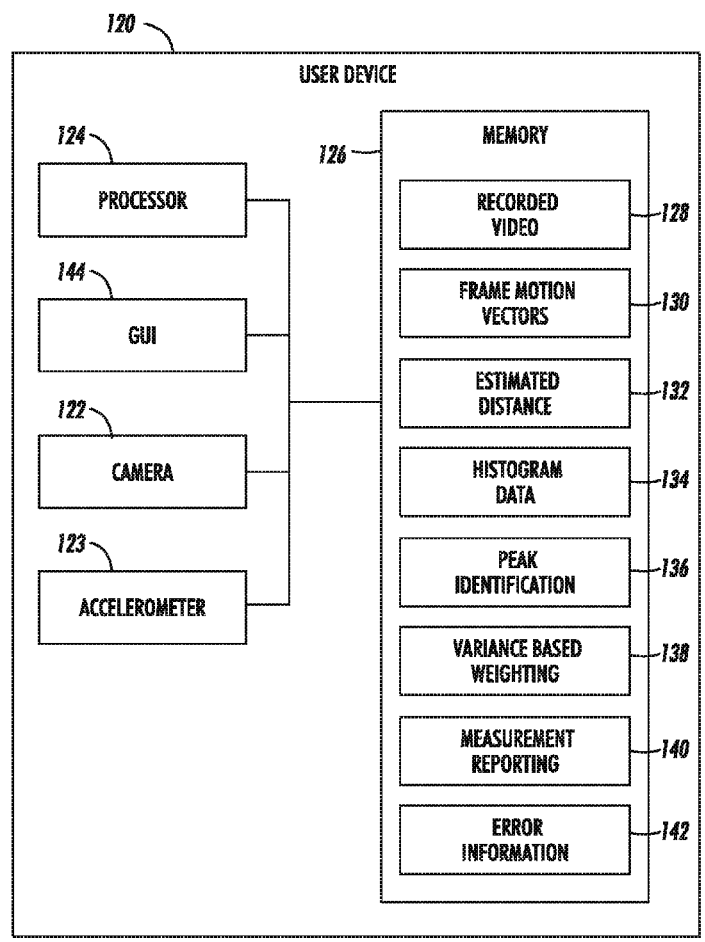
FIG. 3 illustrates a user device, such as a smart phone or the like, that facilitates estimating a distance to a target object using a single camera, in accordance with one or more aspects described herein.

FIG. 3 illustrates a user device 120, such as a smart phone or the like, that facilitates estimating a distance to a target object using a single camera 122, in accordance with one or more aspects described herein. The user device is configured to perform the method(s), techniques, etc., described herein with regard to the preceding figures, and comprises the camera 122 and an onboard accelerometer 123, each of which is coupled to a processor 124 that executes, and a memory 126 that stores computer-executable instructions for performing the various functions, methods, techniques, steps, and the like described herein. The processor 124 and memory 126 may be integral to each other or remote but operably coupled to each other. In another embodiment, the processor and memory reside in a computer (e.g., the computer 30 of FIG. 1) that is operably coupled to the user device 120.

As stated above, the user device 120 comprises the processor 124 that executes, and the memory 126 that stores one or more computer-executable modules (e.g., programs, computer-executable instructions, etc.) for performing the various functions, methods, procedures, etc., described herein. "Module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

Camera 122 records video of one or more target objects and the recorded video 128 is stored in the memory 126. After the video has been recorded by the camera, the processor estimates camera velocity using one or more camera motion values provided by the accelerometer 123. In one example, an integrated value of the onboard accelerometer is used to estimate the camera velocity (e.g., both direction and magnitude). The processor identifies motion vectors 130 for video compression with the help of the accelerometer data. For instance, the frame motion vectors 130 used for video compression are determined by searching in (or near) a direction of movement of the camera measured by the accelerometer (e.g. by using SenseCoding or the like), in contrast to using conventional techniques that use only the visual information in the video to determine the motion vectors. The processor determines an estimated distance 132 to one or more target objects from both camera motion information provided by the accelerometer 123 and compression motion vector 130 information. For instance, distance from both the camera motion and the appropriate (i.e. substantially aligned with the direction of camera motion rather than optimized purely for maximal redundancy) compression motion vectors are estimated by the processor. In one example, Equation 4(a) (above) can be used to perform this estimation.

The processor generates histogram data 134 and executes a peak identification module 136 to identify peaks in a distance-based histogram that represents the relative frequency of occurrence of the block-wise distance values in order to isolate objects in the video frames and remove noise. The processor executes a variance based weighting module 138 when combining distance estimates. In one example, Equation (6) (above) can be employed. The processor executes a measurement reporting module 140 output and/or store (e.g. to the memory) distance-to-object measurement information. According to one example, error bounds and/or estimated measurement precision information 142 is also output and/or stored. For example, equation 5(a) (above) can be employed.

In another embodiment, one or more of the distance measurement and/or error information is displayed graphically on a graphical user interface 144 that may be integral to the user device 120, remote but operably coupled thereto, or may reside on a computer such as the computer 30 of FIG. 1.

Figure 4:
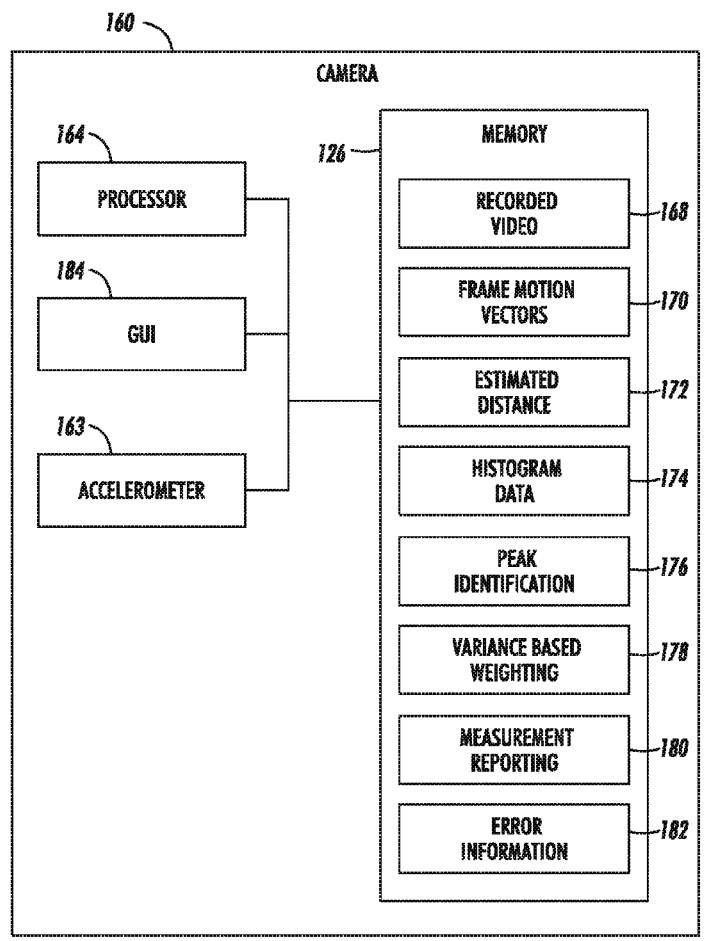
FIG. 4 illustrates a camera, such as a video camera or the like, in which the subject systems and methods are employed and which facilitates estimating a distance to a target object, in accordance with one or more aspects described herein.

FIG. 4 illustrates a camera 160, such as a video camera or the like, in which the subject systems and methods are employed and which facilitates estimating a distance to a target object, in accordance with one or more aspects described herein. The camera is configured to perform the method(s), techniques, etc., described herein with regard to the preceding figures, and comprises the onboard accelerometer 163, which is coupled to a processor 164 that executes, and a memory 166 that stores computer-executable instructions for performing the various functions, methods, techniques, steps, and the like described herein. The processor and 64 and memory 166 may be integral to each other or remote but operably coupled to each other. In another embodiment, the processor and memory reside in a computer (e.g., the computer 30 of FIG. 1) that is operably coupled to the camera 160.

Camera 160 records video of one or more target objects and the recorded video 168 is stored in the memory 166. After the video has been recorded by the camera, the processor estimates camera velocity using one or more camera motion values provided by the accelerometer 163. In one example, an integrated value of the onboard accelerometer is used to estimate the camera velocity (e.g., both direction and magnitude). The processor identifies motion vectors 170 for video compression. For instance, the frame motion vectors 170 used for video compression are determined by searching in (or near) a direction of movement of the camera measured by the accelerometer (e.g. by using SenseCoding or the like), in contrast to using conventional techniques that use only the video. The processor determines an estimated distance 172 to one or more target objects from both camera motion information provided by the accelerometer 163 and compression motion vector 170 information. For instance, distance from both the camera motion and the appropriate (i.e. substantially aligned with the direction of camera motion rather than optimized purely for maximal redundancy) compression motion vectors are estimated by the processor. In one example, Equation 4(a) (above) can be used to perform this estimation.

The processor generates histogram data 174 and executes a peak identification module 176 to identify peaks in a distance-based histogram in order to isolate objects in the video frames and remove noise. The processor executes a variance based weighting module 178 when combining distance estimates. In one example, Equation (6) (above) can be employed. The processor executes a measurement reporting module 180 output and/or store (e.g. to the memory) distance-to-object measurement information. According to one example, error bounds and/or estimated measurement precision information 182 is also output and/or stored. For example, equation 5(a) (above) can be employed.

In another embodiment, one or more of the distance measurement and/or error information is displayed graphically on a graphical user interface 184 that may be integral to the camera 160, remote but operably coupled thereto, or may reside on a computer such as the computer 30 of FIG. 1.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for estimating distance to an object using motion measurement and video compression attributes derived from video captured by a single camera, comprising:
   estimating camera velocity using one or more camera motion values provided by an accelerometer associated with the camera;
   identifying frame motion vectors generated during compression of video captured by the camera;
   estimating distance to a target object from the one or more camera motion values provided by the accelerometer and motion vector information; and
   reporting at least one distance-to-object measurement.

2. The method according to claim 1 wherein the target object distance estimation comprises:
   mapping motion vector lengths to block-wise distance values using accelerometer data;
   generating a distance-based histogram that represents the relative frequency of occurrence of the block-wise distance values;
   identifying peaks in the distance-based histogram in order to isolate objects and remove noise; and
   combining distance estimates using variance-based weighting.

3. The method according to claim 1, wherein the camera resides in a smart phone that has an onboard accelerometer.

4. The method according to claim 1, wherein the one or more camera motion values represent a direction and a magnitude of camera motion.

5. The method according to claim 1, wherein the frame motion vectors are determined by searching in the direction of camera motion as determined by analysis of the accelerometer data.

6. The method according to claim 1, wherein estimating distance to the target object comprises estimating distance as a function of camera motion magnitude and direction of camera motion within a predetermined alignment threshold of the direction of camera motion.

7. The method according to claim 6, wherein the predetermined alignment threshold is less than or equal to 30° from the direction of camera motion.

8. The method according to claim 6, wherein estimated camera velocity is described in equation:

$$mv_{cam} = (d/z) * v_{real} => z = d(mv'_{cam} \cdot v_{real})/(mv'_{cam} \cdot mv_{cam}) \quad (4a)$$

where $mv_{cam}$ is the motion vectors in the camera domain ($x'_c i, +y'_c j$) and $v_{real}$ is the real velocity ($x'i, +y'j$).

9. The method according to claim 1, wherein combining distance estimates using variance-based weighting comprises defining distance estimates such that:

$$z_{est} = \{\Sigma_i (v'_{i\text{-}real} \cdot v_{i\text{-}real}) z_i\} / \{\Sigma_i (v'_{i\text{-}real} \cdot v_{i\text{-}real})\} \quad (6)$$

where $z_i$ is the distance estimate from the $i^{th}$ frame and $v_{i\text{-}real}$ is the measured velocity (in the xy plane—a vector quantity) of the $i^{th}$ frame (average velocity between the i−1th and ith frame).

10. The method according to claim 1, further comprising reporting error bound information defined by the equation:

$$z_{err} \approx [z/(v'_{real} \cdot v_{real})] * v_{real} * e_{vreal} + [z^2/(d*(v'_{real} \cdot v_{real}))] * v_{real} * e_{mvcam} \quad (5a)$$

where $x'_{err}$ and $y'_{err}$ are the speed error from the accelerometer measurement and $x'_{cerr}$ and $y'_{cerr}$ are the errors of the motion vector estimation in the camera domain, for the matrix notion, the vectors $e_{vreal}$ and $e_{mvcam}$ are ($x'_{err} i, y'_{err} j$) and ($x'_{cerr} i, +y'_{cerr} j$) respectively.

11. A processor configured to execute computer-executable instructions for performing the method of claim 1, the instructions being stored on a non-transitory computer-readable medium.

12. A system that facilitates estimating distance to an object using motion measurement and video compression attributes derived from video captured by a single camera, comprising:
   a non-transitory computer-readable medium that stores computer-executable instructions for execution by a processor; and a processor configured to execute the instructions, the instructions comprising:
  estimating camera velocity using one or more camera motion values provided by an accelerometer associated with the camera;
  identifying frame motion vectors generated during compression of video captured by the camera;
  estimating distance to a target object from the one or more camera motion values provided by the accelerometer and motion vector information; and
  reporting at least one distance-to-object measurement.

13. The system according to claim 12, wherein the target object distance estimation comprises:
  mapping motion vector lengths to block-wise distance values using accelerometer data;
  generating a distance-based histogram that represents the relative frequency of occurrence of the block-wise distance values;
  identifying peaks in the distance-based histogram in order to isolate objects and remove noise; and
  combining distance estimates using variance-based weighting.

14. The system according to claim 12, employed in a smart phone.

15. The system according to claim 12, wherein the one or more camera motion values represent a direction and a magnitude of camera motion.

16. The system according to claim 12, wherein the frame motion vectors are determined by searching in the direction of camera motion as determined by analysis of the accelerometer data.

17. The system according to claim 12, wherein estimating distance to the target object comprises estimating distance as a function of camera motion magnitude and direction of camera motion within a predetermined alignment threshold of the direction of camera motion.

18. The system according to claim 17, wherein the predetermined alignment threshold is less than or equal to 30° from the direction of camera motion.

19. The system according to claim 17, wherein estimated camera velocity is described by the equation:

$$mv_{cam}=(d/z)*v_{real} => z=d(mv'_{cam} \cdot v_{real})/(mv'_{cam} \cdot mv_{cam}) \quad (4a)$$

where $mv_{cam}$ is the motion vectors in the camera domain ($x'_c$ i, $+y'_c$ j) and $v_{real}$ is the real velocity ($x'$ i, $+y'$ j).

20. The system according to claim 12, wherein the instructions for combining distance estimates using variance-based weighting further comprise defining distance estimates such that:

$$z_{est}=\{\Sigma_i(v'_{i-real} \cdot v_{i-real})z_i\}/\{\Sigma_i(v'_{i-real} \cdot v_{i-real})\} \quad (6)$$

where $z_i$ is the distance estimate from the $i^{th}$ frame and $v_{i-real}$ is the measured velocity (in the xy plane—a vector quantity) of the $i^{th}$ frame (average velocity between the i−1th and ith frame).

21. The system according to claim 12, the instructions further comprising reporting error bound information defined by the equation:

$$z_{err} \approx [z/(v'_{real} \cdot v_{real})]*v'_{real}*e_{vreal}+[z^2/(d*(v'_{real} \cdot v_{real}))] *v'_{real}*e_{mvcam} \quad (5a)$$

where $x'_{err}$ and $y'_{err}$ are the speed error from the accelerometer measurement and $x'_{cerr}$ and $y'_{cerr}$ are the errors of the motion vector estimation in the camera domain, for the matrix notion, the vectors $e_{vreal}$ and $e_{mvcam}$ are ($x'_{err}$ i, $+y'_{err}$ j) and ($x'_{cerr}$ i, $+y'_{cerr}$ j) respectively.

22. A non-transitory computer-readable medium having stored thereon computer-executable instructions for estimating distance to an object using motion measurement and video compression attributes derived from video captured by a single camera, the instructions comprising:
  estimating camera velocity using one or more camera motion values provided by an accelerometer associated with the camera;
  identifying frame motion vectors generated during compression of video captured by the camera;
  estimating distance to a target object from the one or more camera motion values provided by the accelerometer and motion vector information; and
  reporting at least one distance-to-object measurement.

23. The non-transitory computer-readable medium according to claim 22, wherein the target object distance estimation comprises:
  mapping motion vector lengths to block-wise distance values using accelerometer data;
  generating a distance-based histogram that represents the relative frequency of occurrence of the block-wise distance values;
  identifying peaks in the distance-based histogram in order to isolate objects and remove noise; and
  combining distance estimates using variance-based weighting.

* * * * *